R. H. FOX.
BALL BEARING.
APPLICATION FILED DEC. 3, 1915.

1,195,953.

Patented Aug. 22, 1916.

Inventor
Rudolph H. Fox

UNITED STATES PATENT OFFICE.

RUDOLPH H. FOX, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,195,953.       Specification of Letters Patent.       Patented Aug. 22, 1916.

Application filed December 3, 1915. Serial No. 64,800.

*To all whom it may concern:*

Be it known that I, RUDOLPH H. Fox, a citizen of the United States of America, residing at New Britain, Connecticut, have invented a new and useful Ball-Bearing, of which the following is a specification.

My present invention relates particularly to thrust bearings of the single row, double acting type such as is disclosed and claimed in the Brown Patent #673,676 of May 7th, 1901.

Important objects of the invention are to automatically center the thrust rings with respect to the shaft or rotating element and to prevent engagement of the thrust rings with the shaft.

Another and further object is to enable the bearing to adjust itself to irregularities in alinement of the shaft, and at the same time preserve the centered relation of the thrust rings with respect to the rotating element.

In the accomplishment of these objects I employ opposed thrust shoulders which are carried by the rotating element and provide these thrust shoulders with means for maintaining the thrust rings between them centered in respect to the rotating element. This centering means may be in the form of inclined and preferably spherical bearing faces on the thrust shoulders engaging with the inner peripheral portions of the rings to hold them centered in respect to the rotating member.

Various other features and details of structure will appear as the specification proceeds.

In the accompanying drawing I have illustrated a practical and preferred form that the invention may take but it will be understood that changes and modification may be made without departing from the true spirit and scope of the invention.

Figure 1:
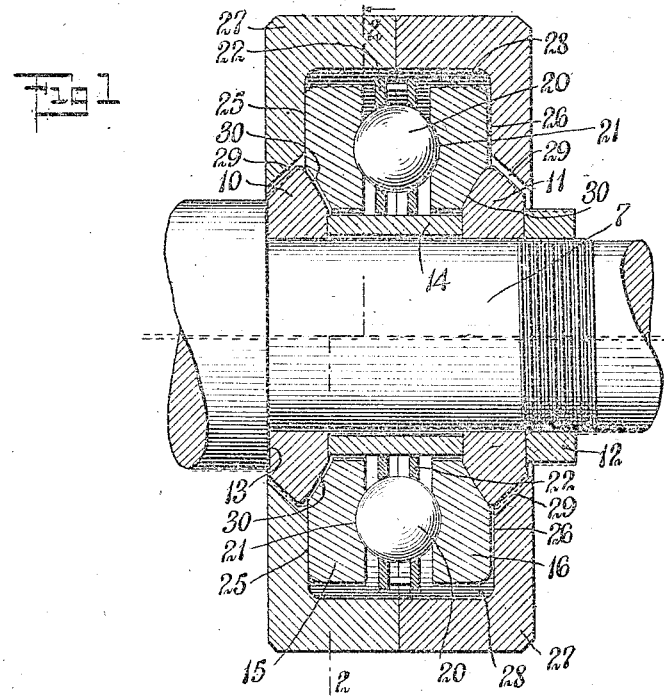
Figure 2:
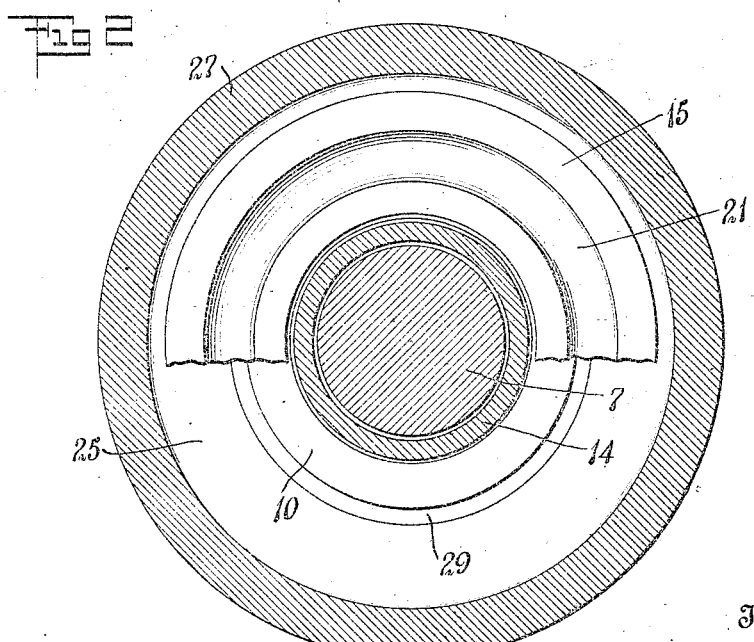

In said drawing—Figure 1, is a central sectional view taken through a bearing embodying the invention. Fig. 2, is a sectional view taken on a plane at right angles to that of Fig. 1 and substantially on the plane of the line 2—2 of Fig. 1.

In the illustration the shaft 7 is the rotating element, this being the usual situation where bearings of this character are employed. The two thrust shoulders are provided in the illustration by the two rings 10 and 11 mounted in spaced apart relation on the shaft or rotating element 7 and secured in fixed relation thereon in this particular instance by being clamped by a nut or other fastening means 12 against a shoulder 13 on the shaft, said rings being properly spaced apart as by means of a spacing sleeve 14. Mounted on the shaft between the thrust shoulders thereon are the two thrust rings 15 and 16 which are adapted to be engaged at their inner peripheral portions by the opposing faces of the two thrust shoulders. Friction reducing elements are interposed between the two thrust rings, taking the form in the present disclosure of a single row of balls 20. The opposing thrust rings may be ball-faced as indicated at 21 and the balls are usually maintained in proper spaced relation by means of a suitable spacer 22. The thrust rings are arranged to engage at their outer peripheral portions with the oppositely disposed abutment walls 25 and 26, these abutment walls comprising in the present disclosure the inner walls of a casing 27 which houses and incloses the thrust rings and the thrust shoulders, said casing being made in two parts bolted or otherwise rigidly secured together. The casing is made enough larger than the thrust rings to permit of a certain lateral or radial movement of the thrust rings in respect to the casing as is indicated at 28. Clearance is also provided between the casing and the thrust shoulders as is indicated at 29 to allow for some disalinement between the shaft and housing.

In Fig. 1 the shaft is illustrated exerting thrust toward the left. This brings the right hand thrust shoulder into active engagement with the right hand thrust ring and the thrust is thereupon carried by the single row of balls to the left hand thrust ring and the abutment wall 25 with which said thrust ring has been forced into engagement. This action carries the left hand thrust shoulder out of engagement with the left hand thrust ring and the right hand thrust ring out of engagement with the abutment wall 26 opposed thereto. The thrust ring 16 engaged by the thrust shoulder now rotates with the shoulder while the other thrust ring 15 is held against rotation by its engagement with the abutment wall 25. When the thrust is in the opposite direction it will be seen that the thrust will be transmitted from the other thrust shoulder 10 to the diagonally opposite abutment wall 26. When the parts are thus operating it is important that the thrust rings be maintained centered with respect to the rotating element and be held out of engagement therewith. I have provided simple and effective means for this purpose, said means consisting of inclined bearing faces 30 on the opposed faces of the thrust shoulders engaging correspondingly inclined bearing faces at the inner peripheral portions of the thrust rings. The effect of these inclined engaging faces is to center the thrust rings with respect to the shaft and to hold said rings out of engagement with the shaft or the spacing sleeve 14 surrounding the shaft. These inclined bearing faces are preferably of spherical formation as indicated to provide for a certain amount of angular self-adjustment of the shaft.

It will be evident from the foregoing disclosure that while the self-centering construction will maintain the thrust rings centered with respect to the rotating element, said thrust rings can move radially or laterally in respect to the relatively fixed abutment walls. Thus even though the shaft may drop somewhat due for instance to the wearing of the radial supporting bearings, as indicated in dotted lines in Fig. 1, the thrust rings will still rotate true with respect to the shaft and the thrust in both directions will be properly taken care of as before.

What I claim is:—

1. In a bearing of the character set forth, the combination of a relatively rotatable shaft and casing, opposed thrust shoulders on said shaft, thrust rings between said thrust shoulders and arranged to be engaged thereby at their inner peripheral portions, said thrust rings and shoulders having spherical engaging surfaces whereby said thrust rings will be centered by said thrust shoulders and a certain amount of angular adjustment between the thrust rings and shaft will be permitted, friction reducing elements between the thrust rings and a casing inclosing the thrust rings having internal abutment walls opposed to and adapted to be engaged by the outer peripheral portions of the thrust rings.

2. In a bearing of the character set forth, the combination of a relatively rotatable shaft and casing, opposed thrust shoulders on said shaft, thrust rings between said thrust shoulders having their inner peripheral portions engaged by said shoulders and provided on their opposing faces will ball races, said thrust rings and thrust shoulders having spherical engaging surfaces whereby said thrust rings may be centered in different angular relations about the shaft, said thrust rings further having bearing at their outer peripheral portions with opposite inner walls of the casing, and a single row of balls engaged in the opposed ball races of the two thrust rings carrying the thrust transmitted through the thrust rings between the thrust shoulders and diagonally opposite walls of the casing and serving by their running engagement in said ball races to center the thrust ring which is engaged with the wall of the casing in respect to the thrust ring which is rotating with the shaft.

RUDOLPH H. FOX.